United States Patent
Zhang et al.

(10) Patent No.: US 12,277,385 B2
(45) Date of Patent: Apr. 15, 2025

(54) TEXT KEYWORD EXTRACTION METHOD, ELECTRONIC DEVICE, AND COMPUTER READABLE STORAGE MEDIUM

(71) Applicant: Aishu Technology Corp., Shanghai (CN)

(72) Inventors: Xiaoyuan Zhang, Shanghai (CN); Xiao Chen, Shanghai (CN); Xiangxiang Ma, Shanghai (CN)

(73) Assignee: AISHU TECHNOLOGY CORP., Shanghai (CN)

( * ) Notice: Subject to any disclaimer, the term of this patent is extended or adjusted under 35 U.S.C. 154(b) by 294 days.

(21) Appl. No.: 17/906,535

(22) PCT Filed: Aug. 18, 2020

(86) PCT No.: PCT/CN2020/109670
§ 371 (c)(1),
(2) Date: Sep. 16, 2022

(87) PCT Pub. No.: WO2021/184674
PCT Pub. Date: Sep. 23, 2021

(65) Prior Publication Data
US 2023/0136368 A1    May 4, 2023

(30) Foreign Application Priority Data
Mar. 17, 2020  (CN) .......................... 202010188511.6

(51) Int. Cl.
*G06F 40/216*   (2020.01)
*G06F 16/31*    (2019.01)
(Continued)

(52) U.S. Cl.
CPC .......... *G06F 40/216* (2020.01); *G06F 16/313* (2019.01); *G06F 16/35* (2019.01); *G06F 40/284* (2020.01); *G06F 40/30* (2020.01)

(58) Field of Classification Search
CPC ...... G06F 40/216; G06F 16/313; G06F 16/35; G06F 40/284; G06F 40/30
See application file for complete search history.

(56) References Cited

U.S. PATENT DOCUMENTS 8,768,960 B2    7/2014  Hu et al.
9,201,957 B2 *  12/2015 Turdakov .............. G06F 16/367
(Continued)

FOREIGN PATENT DOCUMENTS

CN    102929928 A    2/2013
CN    106407482 A    2/2017
(Continued)

OTHER PUBLICATIONS

Onan, Aytuğ, Serdar Korukolu, and Hasan Bulut, "Ensemble of keyword extraction methods and classifiers in text classification", Mar. 2016, Expert Systems with Applications 57, pp. 232-247. (Year: 2016).*

(Continued)

*Primary Examiner* — Daniel C Washburn
*Assistant Examiner* — James Boggs
(74) *Attorney, Agent, or Firm* — Mark H. Whittenberger; Holland & Knight LLP

(57) ABSTRACT

Provided are a keyword extraction method applicable to a Word text, an electronic device, and a computer-readable storage medium. The method includes: acquiring a text and extracting a body of the text; extracting a set number of keywords in the body by a TFIDF algorithm and a set number of keywords in the body by a TextRank algorithm, respectively; acquiring a text name and a text title of the text and segmenting the text name and the text title into words of the text name and words of the text title; constructing text feature vectors of the text and inputting the text feature vectors into a trained keyword extraction model; and (Continued)

extracting a keyword set from the keywords extracted by the TextRank algorithm by using the keyword extraction model to achieve text keyword extraction.

16 Claims, 5 Drawing Sheets

(51) Int. Cl.
*G06F 16/35* (2025.01)
*G06F 40/284* (2020.01)
*G06F 40/30* (2020.01)

(56) References Cited

U.S. PATENT DOCUMENTS

| | | | | |
|---|---|---|---|---|
| 10,878,004 | B2* | 12/2020 | Bao | G06F 18/214 |
| 11,138,381 | B2* | 10/2021 | Zhou | G06F 16/335 |
| 11,416,532 | B2* | 8/2022 | Agnihotram | G06F 16/353 |
| 11,947,911 | B2* | 4/2024 | Zheng | G06V 30/414 |
| 2007/0233465 | A1 | 10/2007 | Sato et al. | |
| 2017/0139899 | A1* | 5/2017 | Zhao | G06F 40/284 |

FOREIGN PATENT DOCUMENTS

| | | |
|---|---|---|
| CN | 108052593 A | 5/2018 |
| CN | 108073568 A | 5/2018 |
| CN | 108121700 A | 6/2018 |
| CN | 108920466 A | 11/2018 |
| CN | 109471937 A | 3/2019 |
| CN | 109543032 A | 3/2019 |
| CN | 109933787 A | 6/2019 |
| CN | 110188344 A | 8/2019 |
| CN | 110232183 A | 9/2019 |
| CN | 109190111 A | 11/2019 |
| CN | 11401040 A | 7/2020 |
| CN | 111401040 A | 7/2020 |
| KR | 100597434 B1 | 7/2006 |
| WO | 2021/169186 A1 | 9/2021 |
| WO | 2021184674 A1 | 9/2021 |

OTHER PUBLICATIONS

Yao, Lu, Zhang Pengzhou, and Zhang Chi, "Research on News Keyword Extraction Technology Based on TF-IDF and TextRank", Jun. 2019, 2019 IEEE/ACIS 18th International Conference on Computer and Information Science (ICIS 2019), pp. 452-455. (Year: 2019).*

Song, Shouyou, Zhongru Wang, Shuai Xu, Shice Ni, and Jia Xiao, "A Novel Text Classification Approach Based on Word2vec and TextRank Keyword Extraction", Jun. 2019, 2019 IEEE Fourth International Conference on Data Science in Cyberspace (DSC), pp. 536-543. (Year: 2019).*

Pan, Suhan, Zhiqiang Li, and Juan Dai, "An Improved TextRank Keywords Extraction Algorithm", May 2019, Proceedings of the ACM Turing Celebration Conference—China, pp. 1-7. (Year: 2019).*

Liu, Xiaohui, Xin Yan, Zhengtao Yu, Guangshun Qin, and Yuanyuan Mo, "Keyword Extraction for Web News Documents Based on LM-BP Neural Network", May 2015, The 27th Chinese Control and Decision Conference (2015 CCDC), pp. 2525-2531. (Year: 2015).*

Zhu, Zede, Miao Li, Lei Chen, Zhenxin Yang, and Sheng Chen, "Combination of Unsupervised Keyphrase Extraction Algorithms", Aug. 2013, Proceedings of the 2013 International Conference on Asian Language Processing, pp. 33-36. (Year: 2013).*

Mihalcea, Rada, and Paul Tarau, "TextRank: Bringing Order into Texts", 2004, Proceedings of the 2004 Conference on Empirical Methods in Natural Language Processing, pp. 404-411. (Year: 2004).*

Search Report issued in International Patent Application No. PCT/CN2020/109670 on Nov. 30, 2020.

First Office Action issued in related application Serial No. CN2020101885116 on Jan. 18, 2021.

Chinese First Office Action issued in related Application Serial No. 202010188511.6 on Jan. 18, 2021.

International Search Report issued in related Application Serial No. PCT/CN2020/109670 on Dec. 7, 2020.

Yongqing, "Research and Implementation of Text-based Keyword Extraction." School of Data Science and Software Engineering, Qingdao University, Qingdao Shandong 266071, China. 1994-2020 China Academic Journal Electronic Publishing House. http://www.cnki.net.

Durai et al, "Complex Network based Supervised Keyword Extractor." Department of Computer Science, University of Delhi, New Delhi 110007, India. Expert Systems With Applications. www.elsevier.com/locate/eswa. Dated Aug. 16, 2019. pp. 1-14.

* cited by examiner

TEXT KEYWORD EXTRACTION METHOD, ELECTRONIC DEVICE, AND COMPUTER READABLE STORAGE MEDIUM

RELATED APPLICATIONS

The subject application is a U.S. National Stage application of International Application No. PCT/CN2020/109670, filed on 18 Aug. 2020, which claims the benefit of Chinese Patent Application No. 202010188511.6, filed on 17 Mar. 2020. The contents of each application incorporated herein by reference.

TECHNICAL FIELD

The present disclosure relates to the technical field of text analysis, for example, a text keyword extraction method, an electronic device and a computer-readable storage medium.

BACKGROUND

Keyword extraction is the key technology of information retrieval, text classification and clustering, and automatic abstract generation and is an important means of quickly acquiring the document subject. Keywords are traditionally defined as a set of words or phrases that can summarize the subject matter of a document. The keywords have important applications in many fields, such as automatic abstract for documents, web page information extraction, document classification and clustering, and search engines. However, in most cases, the keywords are not directly given in the text, so it is necessary to design a keyword extraction method.

In the field of text analysis, the technologies for extracting the text keywords mainly include a TextRank algorithm, a term frequency-inverse document frequency (TFIDF) algorithm, and Latent Dirichlet Allocation (LDA) model.
(1) TextRank Algorithm The TextRank algorithm is evolved from a PageRank algorithm. When the keywords are extracted using the TextRank algorithm, not every word has a connection, but after a window is set, the words in the window have the connection; and a score of each word is calculated and counted using a score calculation formula, and n words with the highest score are obtained as the keywords. The score calculation formula is described below.

$$WS(V_i) = (1-d) + d * \sum_{V_j \in In(V_i)} \frac{\omega_{ji}}{\sum_{V_k \in Out(V_j)} \omega_{jk}} WS(V_j)$$

WS (Vi) denotes a weight (textrank value) of Vi; Vi denotes the word i; d denotes a damping coefficient and is usually taken as 0.85; ω denotes an edge between words i and j, that is, a weight between the two words; $In(V_i)$ denotes a set that can be connected to the Vi; $Out(V_j)$ denotes a set that can be connected to the Vj; i denotes the word i; j denotes the word j which is the word preceding i; and k denotes another word k other than the word i and the word j. The formula indicates that the weight of the word i in the TextRank algorithm depends on a sum of a weight of an edge (j, i) formed by each point j preceding i and a weight of the point j to other edges.
(2) TFIDF Algorithm The TFIDF algorithm is a statistics-based calculation method, and the calculation formula is described below.

$$tfidf_{i,j} = tf_{i,j} \times idf_i$$

$$tf_{i,j} = \frac{n_{i,j}}{\sum_k n_{k,j}}$$

$$idf_i = \log \frac{|D|}{|\{j : t_i \in d_j\}|}$$

$tf_{i,j}$ denotes a term frequency (TF), $idf_i$ denotes an inverse document frequency (IDF), and $n_{i,j}$ denotes the number of instances a word appears in an article; D denotes the total number of document sets; i denotes the word i; and j denotes the word j.

This formula counts the TF and the IDF, and a TFIDF value is often used for indicating the importance of a document word in a document set, where the document word may also be referred to as a feature word or a keyword of the document. The TF refers to the frequency of a word in an article, and the IDF refers to a log value of a value obtained by dividing the total number of file sets in which a word is located by the number of documents including the word and one. The larger the TFIDF value of a word is, the more frequently the word appears in an article, and the lower the number of occurrences in other articles in the file set is, the more likely the TFIDF value indicates the feature or criticality of the article.
(3) LDA Algorithm The LDA algorithm assumes that both the prior distribution of topics in a document and the prior distribution of words in a topic obey the Dirichlet distribution. According to the Bayesian approach, a set of Dirichlet-multi conjugates are obtained through the prior Dirichlet distribution and the multinomial distribution obtained from the observed data, and based on this, the posterior distribution of the topics in the document and the posterior distribution of the words in the topic are inferred, which are the result we need finally.

Although the keywords of the text may be extracted to a certain extent in the preceding three methods, a text name and a text title are not considered in any of the methods. Therefore, important information is lost and thus some important information is less for extracting the keywords of the article.

SUMMARY

The present application provides a keyword extraction method applicable to a Word text, an electronic device, and a computer-readable storage medium, so as to improve an accuracy rate and a recall rate.

The present application may be implemented by the technical schemes described below.

A text keyword extraction method includes the steps described below.

In S1, a text is acquired and a body of the text is extracted.

In S2, a set number of keywords are extracted by a TFIDF algorithm and a set number of keywords are extracted by a TextRank algorithm, respectively.

In S3, a text name and a text title of the text are acquired and the text name and the text title are segmented into words of the text name and words of the text title.

In S4, text feature vectors of the text are constructed and the text feature vectors are inputted into a trained keyword extraction model.

In S5, a keyword set is extracted from the keywords extracted by the TextRank algorithm by using the keyword extraction model to achieve text keyword extraction.

An electronic device includes a processor and a memory configured to store a program.

When the program is executed by the processor, the processor performs the text keyword extraction method.

A computer-readable storage medium stores computer-executable instructions for executing the text keyword extraction method.

DETAILED DESCRIPTION

The present application is described hereinafter in detail in conjunction with drawings and embodiments. Apparently, the described embodiments are part, not all, of embodiments of the present application. Based on the embodiments of the present application, all other embodiments obtained by those of ordinary skill in the art without creative work are within the scope of the present application.

It is to be understood that in an article, the name and title of the article play a more important role in the article. Some words in the name or title of the article can generally represent the article, except for articles with arbitrary names and articles without titles. The name and title of the article are generally formulated so as to know the approximate contents of the article when the file is not opened. The title of the article is the skeleton of the content of the entire article, represents the main core content of each paragraph, and serves as a connecting link between the preceding and the following in the article.

For example, the file name is "Stylish Victory! Nowitzki on site helps the Dallas Cowboys team kick off the season" (citing a piece of sports news in Baidu News as an example), and five keywords extracted by the preceding method are: Dallas, game, season, Cowboys, and team. The keywords of this piece of news should include "Nowitzki", but "Nowitzki" only appears when 10 keywords are extracted. Therefore, the extracted keywords are not satisfactory and cannot satisfy real keyword extraction requirements.

Embodiment

Figure 1:
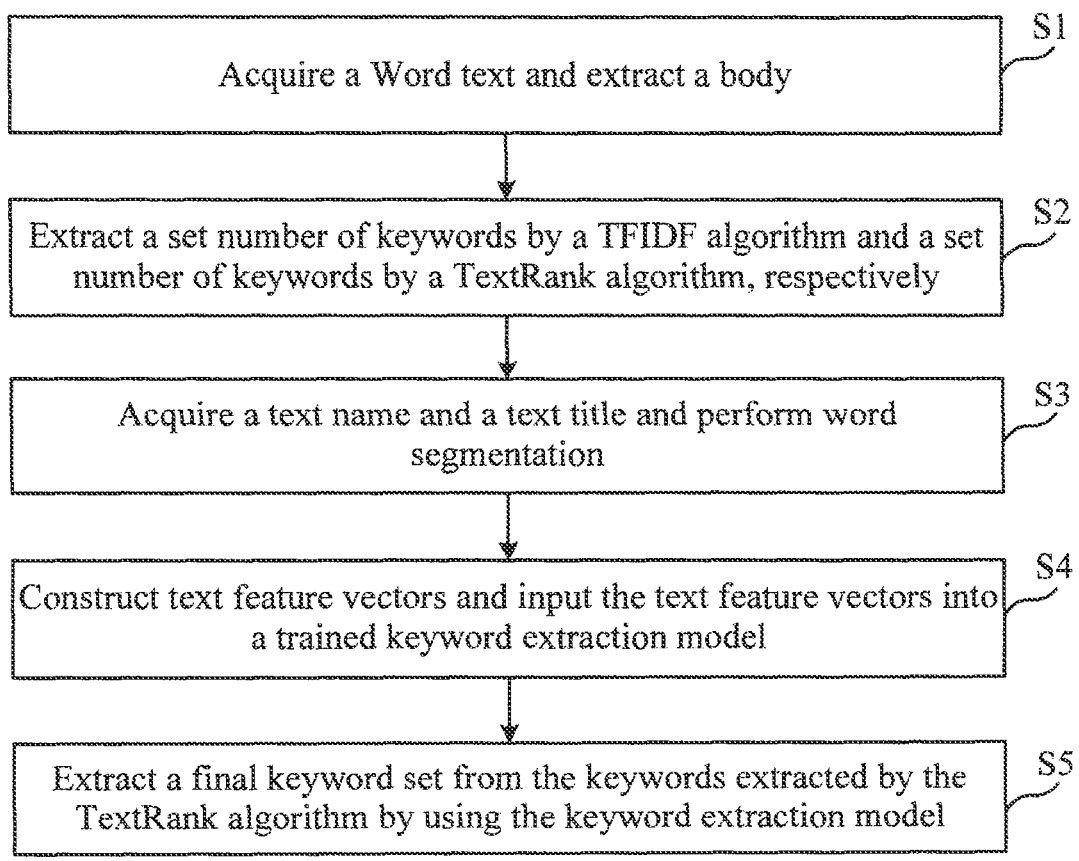
FIG. 1 is a flowchart of a keyword extraction method according to the present application.

As shown in FIG. 1, the present application provides a keyword extraction method applicable to a Word text. The method includes the steps described below.

In S1, a Word text is acquired and a body is extracted.

In S2, a set number of keywords are extracted by a TFIDF algorithm and a set number of keywords are extracted by a TextRank algorithm, respectively.

In S3, a text name and a text title are acquired and word segmentation is performed.

In S4, text feature vectors are constructed and inputted into a trained keyword extraction model.

In S5, a final keyword set is extracted from the keywords extracted by the TextRank algorithm by using the keyword extraction model to complete text keyword extraction.

In some embodiments, the keyword extraction model may be a logistic regression (LR) model, a support vector machine (SVM) model, or a decision tree model. The LR model may get better results.

Figure 2:
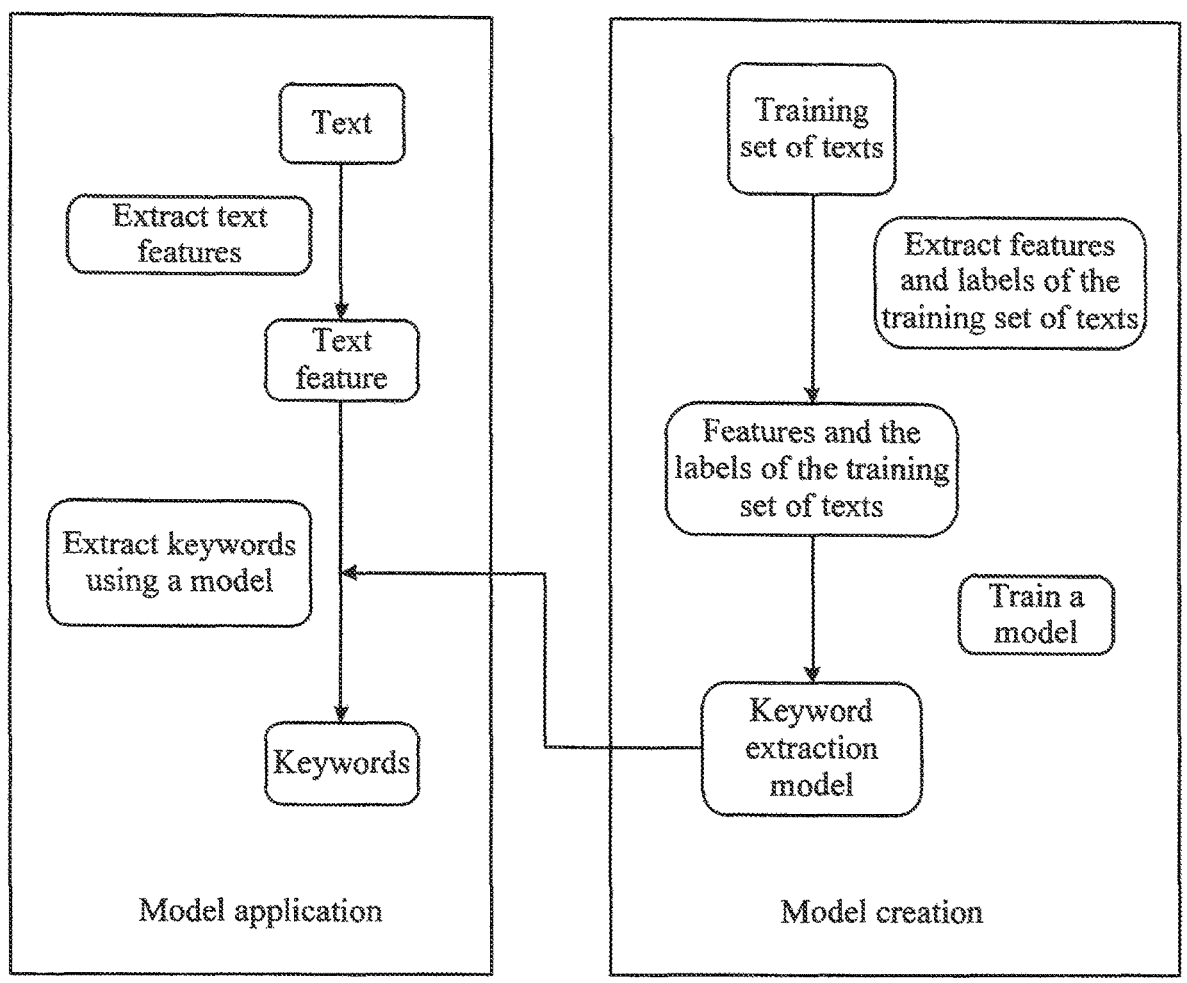
FIG. 2 is a schematic diagram of an overall process according to the present application.

As shown in FIG. 2, the present application is mainly divided into two parts, where the first part is to train a model, and the second part is to apply the model to extract keywords. FIG. 2 shows main processes of a model training stage and a stage of applying the model to extract keywords. The model training needs a certain number of data texts. Test data texts used in this method are multiple papers from the network.

Figure 3:
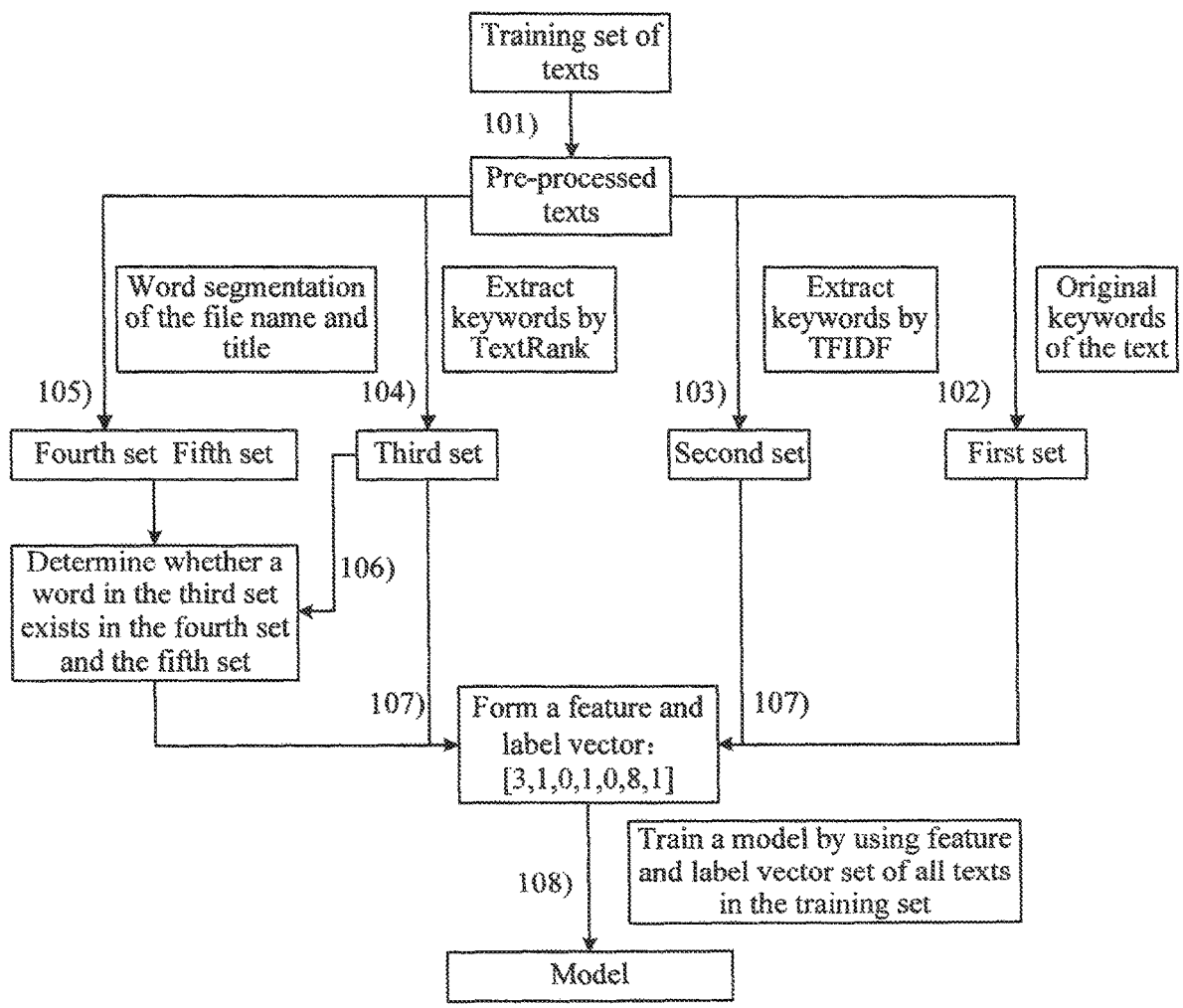
FIG. 3 is a schematic diagram of model training.

As shown in FIG. 3, a model training method includes the steps described below.

101) A training set of texts are prepared in advance, where each of the texts includes a file name (that is, a text name), a title, and a body, and the file name is a meaningful file name. Files are pre-processed to obtain pre-processed texts, where the pre-processing includes deleting some texts that are not text contents, for example, in a paper, "your current location: the Paper Network>>Accounting Audit Paper>>Audit Paper>>papers about studies on the Influence of Big Data and Cloud Computing Technology on Audit>>Study on the Influence of Big Data and Cloud Computing Technology on Audit". Since some noises may be downloaded when data is downloaded from the network, the noises are deleted so as to reduce the adverse influence on the accuracy of text keyword extraction. If the downloaded data is web page data, the web page format in the downloaded web page data may be deleted, so as to process the text into the text data as it is as much as possible.

102) After the text preprocessing is completed, original keywords of the texts are extracted. Since the extracted keywords are mostly binary words or trigrams words, such as ["silica and silicic acid", "teaching design", and "core literacy"], to correspond to the words extracted by the TextRank algorithm and the TFIDF algorithm, the extracted keywords are segmented to obtain a set of words, such as ["silica", "and", "silicic acid", "teaching", "design", "core", "literacy"], as a first set. Then the extracted first set is used as a label of the text feature vector.

103) Multiple top-ranked phrases are extracted by the TFIDF algorithm to form a second set. The number of extracted phrases is user-defined data. In this embodiment, the number of extracted phrases is set to 100. After each tfidf value is calculated by the TFIDF algorithm, sorting is performed to extract the top-ranked 100 words, such as [silicic acid, silica, silicon, solution, acid, intention, high school chemistry, nature, oxide, student, teaching, chemical equation, element, silica gel, carbonic acid, compound, reaction, experiment, glass, chemistry, literacy, carbon dioxide, hydrofluoric acid, grouping, identification . . . ].

104) Multiple top-ranked phrases of the text are extracted by the TextRank algorithm as a third set. The number of extracted phrases is user-defined data. In this embodiment, the number of extracted phrases is set to 100. For example, the extracted phrases are [student, study, silicic acid, nature, in, design, silica, S, cultivation, problem, intention, element, silicon, solution, knowledge, teaching, experiment, application, acid, C, link, high school chemistry, of, literacy, classroom, paper, write, reaction, have, research . . . ].

105) The file name and title are extracted and word segmentation is performed on the file name and title, respectively, to obtain a fourth set and a fifth set, where the fourth set is a set after the file name is segmented, and the fifth set is a set after the title is segmented. Since weights of the words in the file name and weights of the words in title may not be the same, the word segmentation may be performed on the file name and title, respectively, so as to form two sets, each representing one feature. For example, the fourth set obtained after the file name is segmented is [based on, high school, chemistry, core, literacy, of, classroom, teaching, design], and the fifth set obtained after the title is segmented is [design, concept, teaching, background, analysis, goal, design, focus, difficulty, method, tool].

106) Whether the words in the third set appear in the fourth set and the fifth set is determined, respectively. If so, it is expressed as a vector [1, 0], and if no, it is expressed as a vector [0, 1].

107) A text feature vector matrix is constructed. Each text is represented by a 100*7 feature vector matrix. The number of training texts is the same as the number of such matrices. The matrix includes vectors corresponding to 100 keywords in the third set, that is, each word in the third set corresponds to a seven-digit vector, and 100 seven-digit vectors together form the text feature vector matrix. For example, the word "teaching" corresponds to [16, 11, 1, 0, 1, 0, 1], where the first digit "16" indicates a ranking of the word "teaching" among the top-ranked 100 keywords extracted by the TextRank algorithm; the second digit "11" indicates a ranking of the word "teaching" among the top-ranked 100 keywords extracted by the TFIDF algorithm, where if the word "teaching" does not exist in the second set (that is, the top-ranked 100 words extracted by the TFIDF algorithm), it is recorded as 100; the third digit and the fourth digit [1, 0] indicate that "teaching" exists in the file name; the fifth digit and the sixth digit [1, 0] indicate that "teaching" exists in the title; and the seventh digit "1" indicates that the word "teaching" is one of the original keywords.

108) After the text feature vector matrix is obtained, a model P (Y|X) is created, and the model may be trained. Here, the LR model is used. The first six digits of the vector are used as X, and the seventh digit is used as Label Y, so as to obtain the trained keyword extraction model.

Figure 4:
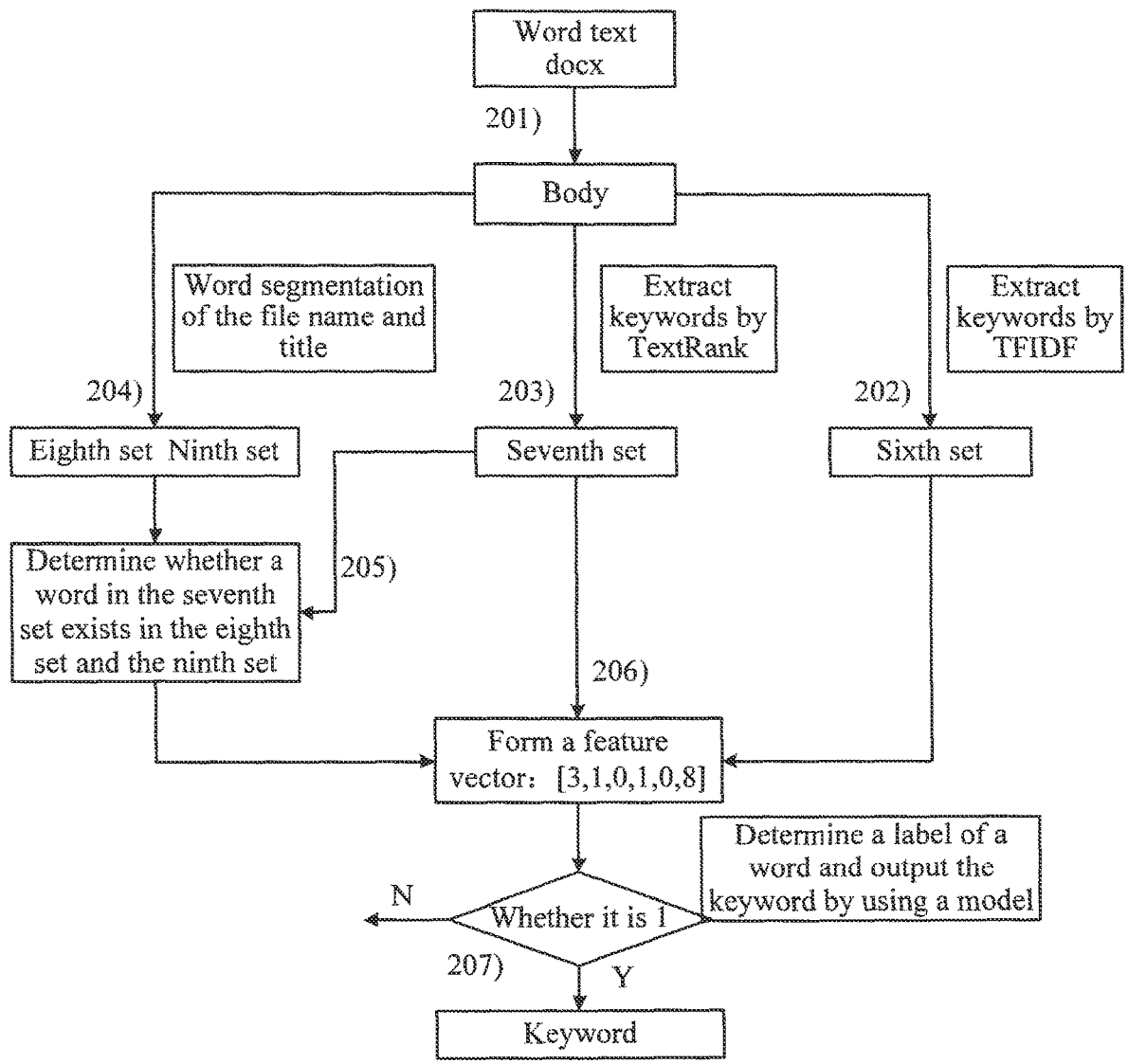
FIG. 4 is a schematic diagram of keyword extraction using a model.

As shown in FIG. 4, after the model is obtained, the keywords may be extracted from the Word text. The data processing and the model training partially overlap. To express clearly, a part, the same as a part in the model training, in the data processing is also explained in detail according to the steps described below.

201) The body is extracted from a file whose suffix is docx. The Word text in this method may support the file whose suffix is docx. If a file is a doc file, the file may be converted into a docx file and operated.

202) The tfidf value of each word is calculated by the TFIDF algorithm and ranked, and the top-ranked 100 words are extracted as a sixth set, such as [stock value, net profit, options, liquidation, net assets, explanatory power, model, growth rate, yield, stock price . . . ].

203) The top-ranked 100 keywords of the body are extracted by the TextRank algorithm as a seventh set, such as [company, value, model, empirical, evaluation, net profit, net assets, operation, yield, paper, options, data, Country Garden, stock value . . . ].

204) The file name and title are acquired from the docx file. For example, the file name is ["An Empirical Analysis Based on the Improved Residual Return Model"], the title is ["Overview of the Improved EBO Model, Empirical Analysis, EBO Model Parameter Determination, Binary Tree Model Construction, Conclusion"], and the word segmentation is performed on the file name and title, respectively, to obtain an eighth set: [based, improved, of, residual, return, model, of, empirical, analysis] and a ninth set: [improved, of, EBO, model, overview, empirical, analysis, EBO, model, parameter, determination, binary tree, model, of, construction, conclusion].

205) Whether the words in the seventh set appear in the eighth set and the ninth set is determined, respectively. If so, it is expressed as a vector [1, 0], and if no, it is expressed as a vector [0, 1].

206) A text feature vector including six digits is constructed. For example, the word "model" corresponds to [3, 7, 1, 0, 1, 0], where the first digit "3" indicates a ranking of the word "model" among the top-ranked 100 keywords extracted by the TextRank algorithm; the second digit "7" denotes a ranking of the word "model" among the top-ranked 100 keywords extracted by the TFIDF algorithm, where if the word does not exist in the sixth set (that is, the top-ranked 100 words extracted by the TFIDF algorithm), it is recorded as 100; the third digit and the fourth digit [1, 0] indicate that the word "model" exists in the file name; and the fifth digit and the sixth digit [1,0] indicate that the word "model" appears in the title. In this manner, the feature vector about this text is constructed.

207) Whether the word is a keyword is determined using the trained keyword extraction model and the constructed text feature vector. If the word is a keyword, 1 is outputted, and if the word is not a keyword, 0 is outputted. Through this step, after the 100 keywords extracted by the TextRank algorithm are re-determined, the keywords with the determination result of 1 are taken as the final keyword set, thereby completing text keyword extraction.

In this embodiment, a test performed on this method may be described below.

For test data, a total of 116,532 papers are downloaded, including categories such as politics, teaching, and economics. Some data are screened according to whether the data includes keywords, titles, and other information. The papers actually used are described below.

| Number of test texts | Coverage | Additional notes |
| --- | --- | --- |
| 3556 articles for training | Politics, teaching, economics and other papers | Free online papers |
| 535 articles for testing | Politics, teaching, economics and other papers | Free online papers |

(i) Comparison Between Various Text Keyword Extraction Methods 1, the test data is a paper named "Research on Financial Services of Small and Micro Enterprises Based on Commercial Banks" among 535 articles.

2, keywords are extracted by the TextRank algorithm, the TFIDF algorithm and the method of the present application.

The keywords extracted by the TextRank algorithm are extracted based on this paper. Since a idf value in the TFIDF algorithm needs to be calculated from multiple pieces of test data, when the keywords are extracted, the idf value is calculated based on a test set of 535 papers, and the tfidf value involved in the method of the present application is also calculated based on the test set.

3, results of original keywords of the paper and 10 keywords extracted by different algorithms are described in Table 1. This method adopts the LR model, the SVM model, and the decision tree to extract the keywords respectively. The original keywords of the paper and the keywords extracted using different models in this method are not ranked in order, and top-ranked ten words are extracted using different values by the TextRank algorithm and the TFIDF algorithm, respectively.

TABLE 1

Keyword Extraction Test Results

| Keywords of the paper | TextRank | TFIDF | LR model used in this method | SVM model used in this method | Decision tree model used in this method |
| --- | --- | --- | --- | --- | --- |
| Commerce | Enterprise (13.15) | Financial service (0.043) | Enterprise | Enterprise | Enterprise |
| Bank | Small and micro (10.85) | Bank (0.022) | Small and micro | Financial service | Small and micro |
| Small and micro | In (5.89) | Commerce (0.020) | Financial service | | Financial service |
| Enterprise | Economics (5.32) | Customer (0.013) | Bank | | Bank |
| Financial service | Bank (4.78) | Business process (0.011) | | | |
| Research | Perform (4.42) | Branch (0.0094) | | | |
| | Comparison (4.33) | Ministry of Finance (0.0093) | | | |
| | Commerce (4.17) | Architecture (0.0092) | | | |
| | Financial service (3.93) | Process (0.0076) | | | |
| | Development (3.82) | Loan (0.0072) | | | |

The test results show that for this article, in this method, only words that the model considers to be keywords are extracted, and the accuracy rate and the recall rate are higher than those of TextRank and TFIDF for extracting the keywords.

(ii) Accuracy Rate and Recall Rate of Different Keyword Extraction Methods

Test data is the preceding training set of 3556 papers and the preceding test set of 535 papers.

The steps may be described below.

1, the model is trained using the training set of 3556 papers. According to the process in FIG. 2, the same processing is performed on each paper in the training set, the original paper keywords are extracted, top-ranked 100 keywords are extracted by the TextRank algorithm, top-ranked 100 keywords are extracted by the TFIDF, titles of the papers are extracted, and file names are acquired.

2, a text feature vector matrix is created for each text of a total of 3556 papers, and each paper corresponds to a vector matrix with a size of 100*7.

3, X and Y of the matrix vector are extracted, and different models are created using different methods in Scikit-learn. For example, a keyword extraction model P (X|Y) is created using the LR, the SVM and the decision tree, respectively, and the keyword extraction model is trained.

4, after the model training is completed, test data of 535 papers is processed, the original paper keywords are extracted, top-ranked 100 keywords are extracted by the TextRank algorithm, top-ranked 100 keywords are extracted by the TFIDF, the titles of the papers are extracted, the file names are acquired, and the text feature vector is extracted using the text contents.

5, the 100 keywords extracted by the TextRank algorithm are re-determined using the text feature vector and the keyword extraction model, and the words determined to be keywords are finally extracted as the final keyword set.

6 the keywords extracted by different models in the method of the present application are compared with the original keywords, and the accuracy rate and the recall rate are calculated.

7, the keywords of the test set of 535 papers are extracted by the TextRank algorithm and the TFIDF algorithm and compared with the original keywords, so as to calculate the accuracy rate and the recall rate.

After the test of the test set, the accuracy rate and the recall rate of extracted keywords are described in Table 2.

| Keyword extraction algorithm | Accuracy rate | Recall rate |
|---|---|---|
| TextRank | 0.7865 | 0.6300 |
| TFIDF | 0.6357 | 0.5361 |
| LR model used in the present application | 0.9339 | 0.6576 |
| SVM model used in the present application | 0.9056 | 0.6324 |
| Decision tree model used in the present application | 0.9423 | 0.5997 |

The following conclusions may be drawn from the analysis of the test results.

1, by comparison, the accuracy rate and the recall rate of keywords extracted by different models in this method are generally better than those of keywords extracted by the TextRank algorithm and keywords extracted by the TFIDF algorithm. The recall rate is not improved much, and that is because when the TextRank algorithm and the TFIDF algorithm are used in this embodiment, 10 keywords are respectively extracted, and the number of extracted keywords is relatively large. The accuracy rate is improved significantly, up to 16% higher than the TextRank algorithm and 31% higher than the TFIDF algorithm.

2. Through the internal comparison of this method, from the perspective of the accuracy rate, the effect of the LR model is similar to the effect of the decision tree model and is slightly better than the effect of the decision tree model.

The definitions of the accuracy rate and the recall rate are described below.

First, for a confusion matrix, if a problem of binary classification exists, four cases occur when predicted results and actual results are combined in pairs.

|  |  | Actual results | |
|---|---|---|---|
|  |  | 1 | 0 |
| Predicted results | 1 | 11 | 10 |
|  | 0 | 01 | 00 |

Since the representation by numbers 1 and 0 does not facilitate reading, after conversion, T (True) denotes correctness, F (False) denotes incorrectness, P (Positive) denotes 1, and N (Negative) denotes 0. A predicted result (P|N) is referred to first, and then a determination result (T|F) is given based on the comparison between the actual results and the predicted results. Based on the preceding logic, the table below is obtained after redistribution.

|  |  | Actual results | |
|---|---|---|---|
|  |  | 1 | 0 |
| Predicted results | 1 | TP | FP |
|  | 0 | FN | TN |

TP, FP, FN, and TN may be understood below.

TP: the predicted result is 1, the actual result is 1, and the prediction is true.

FP: the predicted result is 1, the actual result is 0, and the prediction is false.

FN: the predicted result is 0, the actual result is 1, and the prediction is false.

TN: the predicted result is 0, the actual result is 0, and the prediction is true.

The accuracy rate refers to, in terms of the predicted results, a probability that a sample among all the samples predicted to be positive is actually positive. The expression of the accuracy rate is described below.

$$\text{Accuracy rate} = \frac{TP}{TP + FP}$$

The recall rate refers to, in terms of original samples, a probability that a sample among all the actually positive samples is predicted to be positive. The expression of the recall rate is described below $$\text{Recall rate} = \frac{TP}{TP + FN}$$

Figure 5:
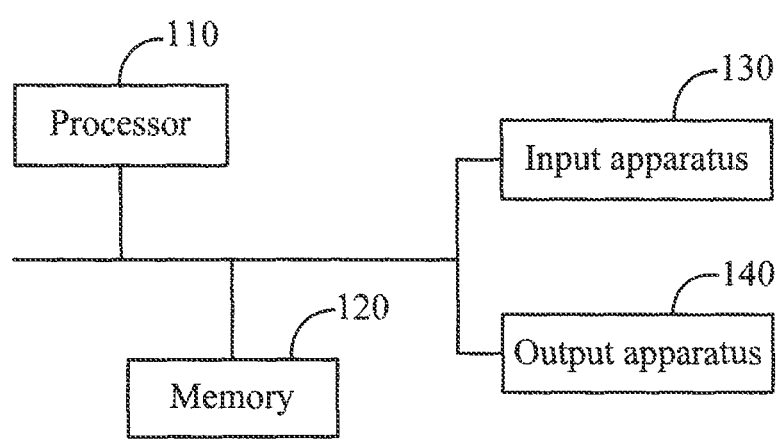
FIG. 5 is a structural diagram of an electronic device according to the present application.

FIG. 5 is a structural diagram of hardware of an electronic device according to an embodiment. As shown in FIG. 5, the electronic device includes one or more processors 110 and a memory 120. One processor 110 is used as an example in FIG. 5.

The electronic device may further include an input apparatus 130 and an output apparatus 140.

The processor 110, the memory 120, the input apparatus 130, and the output apparatus 140 that are in the electronic device may be connected by a bus or in other manners. A connection by a bus is used as an example in FIG. 5.

As a computer-readable storage medium, the memory 120 may be configured to store software programs, computer-executable programs, and modules. The processor 110 runs the software programs, instructions and modules stored in the memory 120 to perform function applications and data processing, that is, to implement any method in the preceding embodiments.

The memory 120 may include a program storage region and a data storage region. The program storage region may store an operating system and an application program required by at least one function. The data storage region may store the data created according to the use of the electronic device. Additionally, the memory may include a volatile memory, for example, a random-access memory (RAM), and may also include a non-volatile memory, for example, at least one magnetic disk memory, a flash memory, or another non-transitory solid-state memory.

The memory 120 may be a non-transitory computer storage medium or a transitory computer storage medium. The non-transitory computer storage medium includes, for example, at least one magnetic disk memory, a flash memory, or another non-volatile solid-state memory. In some embodiments, the memory 120 optionally includes memories which are disposed remotely relative to the processor 110. These remote memories may be connected to the electronic device via a network. The examples of the preceding network may include the Internet, an intranet, a local area network, a mobile communication network, and a combination thereof.

The input apparatus 130 may be configured to receive the input digital or character information and generate key signal input related to user settings and function control of the electronic device. The output apparatus 140 may include a display device, for example, a display screen.

This embodiment further provides a computer-readable storage medium storing computer-executable instructions for executing the preceding methods.

All or part of the processes in the methods of the preceding embodiments may be implemented by related hardware executed by computer programs, these programs may be stored in a non-transitory computer-readable storage medium, and during the execution of these programs, the processes in the preceding method embodiments may be included. The non-transitory computer-readable storage medium may be a magnetic disk, an optical disk, a read-only memory (ROM), or an RAM.

Compared with the related art, the present application has the advantages described below.

1) This method takes advantage of the importance of the words in the text name and title to the text keyword extraction, the text name and title are extracted, a relationship between the text name and the keywords extracted by the TextRank algorithm and a relationship between the title and the keywords extracted by the TextRank algorithm are established, and the model is trained, thereby improving the accuracy of the keywords.

2) The present application combines the TFIDF algorithm and the TextRank algorithm as the features of the text. Compared with a single keyword extraction algorithm, this method further improves the accuracy of keyword extraction.

3) In this method, first, multiple keywords are extracted by the TextRank algorithm, whether these words exist in the file name and title is determined, and then in conjunction with the ranking of the TFIDF algorithm, a model that can determine the probability that a word is a keyword is trained. In this manner, a gap between the extracted keywords and the original keywords of the text has high consistency.

What is claimed is:

1. A text keyword extraction method, comprising:
  acquiring a text and extracting a body of the text;
  extracting a set number of keywords in the body by a term frequency-inverse document frequency (TFIDF) algorithm and extracting a set number of keywords in the body by a TextRank algorithm, respectively;
  acquiring a text name and a text title of the text and segmenting the text name and the text title into words of the text name and words of the text title;
  constructing text feature vectors of the text and inputting the text feature vectors into a trained keyword extraction model; and
  extracting a keyword set from the keywords extracted by the TextRank algorithm by using the keyword extraction model to achieve text keyword extraction;
  wherein constructing the text feature vectors of the text and inputting the text feature vectors into the trained keyword extraction model comprises:
  determining whether the keywords extracted by the TextRank algorithm appear in the words of the text name;
  based on a determination result that the keywords extracted by the TextRank algorithm appear in the words of the text name, using a vector [1, 0] to indicate the result that the keywords extracted by the TextRank algorithm appear in the words of the text name; and
  based on a determination result that the keywords extracted by the TextRank algorithm do not appear in the words of the text name, using a vector [0, 1] to indicate the result that the keywords extracted by the TextRank algorithm do not appear in the words of the text name;
  determining whether the keywords extracted by the TextRank algorithm appear in the words of the text title;
  based on a determination result that the keywords extracted by the TextRank algorithm appear in the words of the text title, using a vector [1, 0] to indicate the result that the keywords extracted by the TextRank algorithm appear in the words of the text title; and
  based on a determination result that the keywords extracted by the TextRank algorithm do not appear in the words of the text title, using a vector [0, 1] to indicate the result that the keywords extracted by the TextRank algorithm do not appear in the words of the text title;
  for each of the keywords extracted by the TextRank algorithm, respectively constructing a text feature vector of each of the keywords extracted by the TextRank algorithm by using a ranking of each of the keywords extracted by the TextRank algorithm among the keywords extracted by the TextRank algorithm, a ranking of the each of the keywords extracted by the TextRank algorithm among the keywords extracted by the TFIDF algorithm, a relationship between the each of the keywords extracted by the TextRank algorithm and the text name, and a relationship between the each of the keywords extracted by the TextRank algorithm and the text title; and
  inputting all the text feature vectors into the trained keyword extraction model.

2. The text keyword extraction method of claim 1, wherein the text feature vector of each of the keywords is a vector comprising six digits, wherein a first digit indicates the ranking of the each of the keywords among the keywords extracted by the TextRank algorithm; a second digit indicates the ranking of the each of the keywords among the keywords extracted by the TFIDF algorithm; a third digit and a fourth digit are the vector obtained in the operation of determining whether the keywords extracted by the TextRank algorithm appear in the words of the text name; and a fifth digit and a sixth digit are the vector obtained in the operation of determining whether the keywords extracted by the TextRank algorithm appear in the words of the text title.

3. The text keyword extraction method of claim 2, further comprising:
  based on a determination result that one keyword of the keywords extracted by the TextRank algorithm does not exist in the keywords extracted by the TFIDF algorithm, setting a value of the second digit of the text feature vector of the one keyword to be the number of the keywords extracted by the TFIDF algorithm.

4. The text keyword extraction method of claim 1, wherein extracting the set number of keywords in the body by the TFIDF algorithm and extracting the set number of keywords in the body by the TextRank algorithm, respectively comprises:
  extracting 100 words with top-ranked tfidf values as the keywords of the TFIDF algorithm by using the TFIDF algorithm, and extracting top-ranked 100 words as the keywords of the TextRank algorithm by using the TextRank algorithm.

5. The text keyword extraction method of claim 1, wherein extracting the keyword set from the keywords extracted by the TextRank algorithm by using the keyword extraction model to achieve the text keyword extraction comprises:

determining, by the keyword extraction model, whether the keywords extracted by the TextRank algorithm are real keywords according to the inputted text feature vectors; based on a determination result that the keywords extracted by the TextRank algorithm are the real keywords, outputting 1; based on a determination result that the keywords extracted by the TextRank algorithm are not the real keywords, outputting 0; and taking words with the determination result of 1 as the keyword set to achieve the text keyword extraction.

6. The text keyword extraction method of claim 1, wherein steps of training the keyword extraction model comprise:
   acquiring a plurality of texts each comprising a text name, a text title and a body to form a training set;
   preprocessing the plurality of texts in the training set to obtain a plurality of preprocessed texts;
   extracting original keywords of the plurality of preprocessed texts and segmenting the extracted original keywords as labels of text feature vectors;
   extracting a set number of keywords by the TFIDF algorithm and a set number of keywords by the TextRank algorithm, respectively;
   acquiring the text name and the text title, and determining whether the keywords extracted by the TextRank algorithm appear in the text name and the text title, respectively; based on a determination result that the keywords extracted by the TextRank algorithm appear in the text name and the text title, using a vector [1, 0] to indicate the result that the keywords extracted by the TextRank algorithm appear in the text name and the text title; and based on a determination result that the keywords extracted by the TextRank algorithm do not appear in the text name and the text title, using a vector [0, 1] to indicate the result that the keywords extracted by the TextRank algorithm do not appear in the text name and the text title;
   constructing a text feature vector matrix, wherein the text feature vector matrix comprises vectors corresponding to the keywords extracted by the TextRank algorithm, and each of the vectors comprises seven numbers; and
   creating and training the keyword extraction model by using the text feature vector matrix;
   wherein among the vector comprising seven numbers corresponding to one keyword of the keywords, a first digit indicates a ranking of the one keyword among the keywords extracted by the TextRank algorithm; a second digit indicates a ranking of the one keyword among the keywords extracted by the TFIDF algorithm; a third digit and a fourth digit are the vector used for indicating whether the one keyword appears in the text name; a fifth digit and a sixth digit are the vector used for indicating whether the one keyword appears in the text title; and a seventh digit indicates whether the one keyword is one of the original keywords, wherein the seventh digit is recorded as 1 based on a determination result that the one keyword is one of the original keywords, and the seventh digit is recorded as 0 based on a determination result that the one keyword is not one of the original keywords.

7. The text keyword extraction method of claim 6, wherein the keyword extraction model is a binary classification model P (Y|X), and when the model is trained, first six digits of each of the vectors in the text feature vector matrix are used as X, and the seventh digit of each of the vectors in the text feature vector matrix is used as Label Y.

8. The text keyword extraction method of claim 7, wherein the keyword extraction model is a logistic regression (LR) model, a support vector machine (SVM) model, or a decision tree model.

9. An electronic device, comprising:
   a processor; and
   a memory configured to store a program,
   wherein when the program is executed by the processor, the processor performs:
   acquiring a text and extracting a body of the text;
   extracting a set number of keywords in the body by a term frequency-inverse document frequency (TFIDF) algorithm and extracting a set number of keywords in the body by a TextRank algorithm, respectively;
   acquiring a text name and a text title of the text and segmenting the text name and the text title into words of the text name and words of the text title;
   constructing text feature vectors of the text and inputting the text feature vectors into a trained keyword extraction model; and
   extracting a keyword set from the keywords extracted by the TextRank algorithm by using the keyword extraction model to achieve text keyword extraction-;
   wherein when the program is executed by the processor, the processor performs constructing the text feature vectors of the text and inputting the text feature vectors into the trained keyword extraction model in the following way:
   determining whether the keywords extracted by the TextRank algorithm appear in the words of the text name; based on a determination result that the keywords extracted by the TextRank algorithm appear in the words of the text name, using a vector [1, 0] to indicate the result that the keywords extracted by the TextRank algorithm appear in the words of the text name; and based on a determination result that the keywords extracted by the TextRank algorithm do not appear in the words of the text name, using a vector [0, 1] to indicate the result that the keywords extracted by the TextRank algorithm do not appear in the words of the text name;
   determining whether the keywords extracted by the TextRank algorithm appear in the words of the text title; based on a determination result that the keywords extracted by the TextRank algorithm appear in the words of the text title, using a vector [1, 0] to indicate the result that the keywords extracted by the TextRank algorithm appear in the words of the text title; and based on a determination result that the keywords extracted by the TextRank algorithm do not appear in the words of the text title, using a vector [0, 1] to indicate the result that the keywords extracted by the TextRank algorithm do not appear in the words of the text title;
   for each of the keywords extracted by the TextRank algorithm, respectively constructing a text feature vector of each of the keywords extracted by the TextRank algorithm by using a ranking of each of the keywords extracted by the TextRank algorithm among the keywords extracted by the TextRank algorithm, a ranking of the each of the keywords extracted by the TextRank algorithm among the keywords extracted by the TFIDF algorithm, a relationship between the each of the keywords extracted by the TextRank algorithm and the text name, and a relationship between the each of the keywords extracted by the TextRank algorithm and the text title; and inputting all the text feature vectors into the trained keyword extraction model.

10. The electronic device of claim 9, wherein the text feature vector of each of the keywords is a vector comprising six digits, wherein a first digit indicates the ranking of the each of the keywords among the keywords extracted by the TextRank algorithm; a second digit indicates the ranking of the each of the keywords among the keywords extracted by the TFIDF algorithm; a third digit and a fourth digit are the vector obtained in the operation of determining whether the keywords extracted by the TextRank algorithm appear in the words of the text name; and a fifth digit and a sixth digit are the vector obtained in the operation of determining whether the keywords extracted by the TextRank algorithm appear in the words of the text title.

11. The electronic device of claim 10, wherein when the program is executed by the processor, the processor further performs:
based on a determination result that one keyword of the keywords extracted by the TextRank algorithm does not exist in the keywords extracted by the TFIDF algorithm, setting a value of the second digit of the text feature vector of the one keyword to be the number of the keywords extracted by the TFIDF algorithm.

12. The electronic device of claim 9, wherein when the program is executed by the processor, the processor performs extracting the set number of keywords in the body by the TFIDF algorithm and extracting the set number of keywords in the body by the TextRank algorithm, respectively in the following way:
extracting 100 words with top-ranked tfidf values as the keywords of the TFIDF algorithm by using the TFIDF algorithm, and extracting top-ranked 100 words as the keywords of the TextRank algorithm by using the TextRank algorithm.

13. The electronic device of claim 9, wherein when the program is executed by the processor, the processor performs extracting the keyword set from the keywords extracted by the TextRank algorithm by using the keyword extraction model to achieve the text keyword extraction in the following way:
determining, by the keyword extraction model, whether the keywords extracted by the TextRank algorithm are real keywords according to the inputted text feature vectors; based on a determination result that the keywords extracted by the TextRank algorithm are the real keywords, outputting 1; based on a determination result that the keywords extracted by the TextRank algorithm are not the real keywords, outputting 0; and taking words with the determination result of 1 as the keyword set to achieve the text keyword extraction.

14. The electronic device of claim 9, wherein operations of training the keyword extraction model comprise:
acquiring a plurality of texts each comprising a text name, a text title and a body to form a training set;
preprocessing the plurality of texts in the training set to obtain a plurality of preprocessed texts;
extracting original keywords of each of the plurality of preprocessed texts and segmenting the extracted original keywords as labels of text feature vectors;
extracting a set number of keywords by the TFIDF algorithm and a set number of keywords by the TextRank algorithm, respectively;
acquiring the text name and the text title, and determining whether the keywords extracted by the TextRank algorithm appear in the text name and the text title, respectively; based on a determination result that the keywords extracted by the TextRank algorithm appear in the text name and the text title, using a vector [1, 0] to indicate the result that the keywords extracted by the TextRank algorithm appear in the text name and the text title; and based on a determination result that the keywords extracted by the TextRank algorithm do not appear in the text name and the text title, using a vector [0, 1] to indicate the result that the keywords extracted by the TextRank algorithm do not appear in the text name and the text title;
constructing a text feature vector matrix, wherein the text feature vector matrix comprises vectors corresponding to the keywords extracted by the TextRank algorithm, and each of the vectors comprises seven numbers; and
creating and training the keyword extraction model by using the text feature vector matrix;
wherein among the vector comprising seven numbers corresponding to one keyword of the keywords, a first digit indicates a ranking of the one keyword among the keywords extracted by the TextRank algorithm; a second digit indicates a ranking of the one keyword among the keywords extracted by the TFIDF algorithm; a third digit and a fourth digit are the vector used for indicating whether the one keyword appears in the text name; a fifth digit and a sixth digit are the vector used for indicating whether the one keyword appears in the text title; and a seventh digit indicates whether the one keyword is one of the original keywords, wherein the seventh digit is recorded as 1 based on a determination result that the one keyword is one of the original keywords, and the seventh digit is recorded as 0 based on a determination result that the one keyword is not one of the original keywords.

15. The electronic device of claim 14, wherein the keyword extraction model is a binary classification model P(Y|X), and when the model is trained, first six digits of each of the vectors in the text feature vector matrix are used as X, and the seventh digit of each of the vectors in the text feature vector matrix is used as Label Y.

16. A non-transitory computer-readable storage medium storing computer-executable instructions for executing:
acquiring a text and extracting a body of the text;
extracting a set number of keywords in the body by a term frequency-inverse document frequency (TFIDF) algorithm and extracting a set number of keywords in the body by a TextRank algorithm, respectively;
acquiring a text name and a text title of the text and segmenting the text name and the text title into words of the text name and words of the text title;
constructing text feature vectors of the text and inputting the text feature vectors into a trained keyword extraction model; and
extracting a keyword set from the keywords extracted by the TextRank algorithm by using the keyword extraction model to achieve text keyword extraction;
wherein constructing the text feature vectors of the text and inputting the text feature vectors into the trained keyword extraction model comprises:
determining whether the keywords extracted by the TextRank algorithm appear in the words of the text name; based on a determination result that the keywords extracted by the TextRank algorithm appear in the words of the text name, using a vector [1, 0] to indicate the result that the keywords extracted by the TextRank algorithm appear in the words of the text name; and based on a determination result that the keywords extracted by the TextRank algorithm do not appear in the words of the text name, using a vector [0, 1] to indicate the result that the keywords extracted by the TextRank algorithm do not appear in the words of the text name;

determining whether the keywords extracted by the TextRank algorithm appear in the words of the text title; based on a determination result that the keywords extracted by the TextRank algorithm appear in the words of the text title, using a vector [1, 0] to indicate the result that the keywords extracted by the TextRank algorithm appear in the words of the text title; and based on a determination result that the keywords extracted by the TextRank algorithm do not appear in the words of the text title, using a vector [0, 1] to indicate the result that the keywords extracted by the TextRank algorithm do not appear in the words of the text title;

for each of the keywords extracted by the TextRank algorithm, respectively constructing a text feature vector of each of the keywords extracted by the TextRank algorithm by using a ranking of each of the keywords extracted by the TextRank algorithm among the keywords extracted by the TextRank algorithm, a ranking of the each of the keywords extracted by the TextRank algorithm among the keywords extracted by the TFIDF algorithm, a relationship between the each of the keywords extracted by the TextRank algorithm and the text name, and a relationship between the each of the keywords extracted by the TextRank algorithm and the text title; and inputting all the text feature vectors into the trained keyword extraction model.

* * * * *